United States Patent
Ravikumar et al.

(10) Patent No.: US 7,747,680 B2
(45) Date of Patent: Jun. 29, 2010

(54) COMMUNITY-BASED WEB FILTERING

(75) Inventors: Shanmugasundaram Ravikumar, Berkeley, CA (US); Randolph P. McAfee, San Marino, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 224 days.

(21) Appl. No.: 11/928,167

(22) Filed: Oct. 30, 2007

(65) Prior Publication Data

US 2009/0112974 A1    Apr. 30, 2009

(51) Int. Cl.
G06F 15/16 (2006.01)
G06F 15/173 (2006.01)
G06F 15/177 (2006.01)

(52) U.S. Cl. .............. 709/203; 709/204; 709/205; 709/217; 709/224; 705/7; 705/10; 434/50

(58) Field of Classification Search ......... 709/200–206, 709/217–228; 705/7, 10; 434/50
See application file for complete search history.

(56) References Cited

U.S. PATENT DOCUMENTS

2008/0050714 A1* 2/2008 Avedissian ............. 434/350
2009/0089110 A1* 4/2009 Lara et al. ............... 705/7
2009/0089152 A1* 4/2009 Davis et al. ............. 705/10

* cited by examiner

*Primary Examiner*—Haresh N Patel
(74) *Attorney, Agent, or Firm*—Fiala & Weaver P.L.L.C.

(57) ABSTRACT

Community-based rating information is generated about a Web site, Web page or other network-accessible content for use in Web filtering operations. The rating information may relate to the appropriateness of the content for a particular audience or audiences, such as for children or for children of different age groups. The rating information is based on feedback provided by users who have accessed the content in question. Where the group of users providing feedback is sufficiently large, the rating assigned to the content will tend to accurately reflect community standards. Also, because the rating information is based on user feedback, the rating information can change over time to reflect changing community attitudes towards content.

14 Claims, 12 Drawing Sheets

COMMUNITY-BASED WEB FILTERING

BACKGROUND OF THE INVENTION

1. Field of the Invention

The invention generally relates to systems and methods for controlling access to Web sites, Web pages and other network-accessible content.

2. Background

The Internet is a dangerous place for children. For example, using a Web browser, a child may intentionally or accidentally access Web sites that contain sexually explicit content (such as pornography), that contain violence or other forms of graphic or "extreme conduct," that promote bigotry or hate speech, or that promote gambling, recreational drug use, or alcohol consumption. Furthermore, many Web sites provide social networking opportunities that may expose children to sexual predators. Consequently, many parents reasonably fear for their children's online experience. Yet there is much that is good for children on the Web, too. The problem is how to let children on the Web without watching them incessantly.

Automated solutions exist in the form of Web filtering software (also referred to as "Internet filtering software" or "content control software"). Such software is designed and optimized for controlling what content a user is permitted to access on a particular machine or network. Such software may be used by parents who wish to limit what Web sites their children may view from home computers, by schools performing the same function with regard to computers found at school, and by employers restricting what content may be viewed by employees while on the job.

Web filtering software is limited in that it applies rigid algorithms to determine which Web sites will be blocked and which will not. These algorithms are often inexact. As a result, content that is entirely appropriate for children is sometimes blocked while content that is inappropriate for children is sometimes allowed to pass. Since conventional Web filtering software cannot be made to "learn" from such mistakes, there is no real way to remedy this issue.

Furthermore, the algorithms used by Web filtering software reflect only a single viewpoint with respect to what constitutes inappropriate or undesired content. A parent or other user that employs the software may have a different viewpoint. This different viewpoint may be rooted in any number of factors, including but not limited to age, upbringing, education, profession, religious affiliation and/or community standards. If the viewpoint provided by the software does not match that of the user employing the software, then the filter may be perceived as too wide, too narrow, or both depending on the subject matter being filtered.

Additionally, Web filtering software is typically binary in the sense that it will either block a Web site or pass a Web site for every user of the machine or network upon which the software is installed. However, within a household, there may be one user for which certain types of Web sites are deemed appropriate and another user for which the same types of Web sites are deemed inappropriate. For example, a parent may wish to allow a teenager access to certain types of Web sites but prohibit a toddler from accessing those same Web sites. Current Web filtering software does not provide this capability.

What is needed then is, is a system and method for controlling access to Web sites, Web pages and other network-accessible content that overcomes the aforementioned shortcomings of conventional Web filtering software.

BRIEF SUMMARY OF THE INVENTION

In accordance with one aspect of the present invention, community-based rating information is generated about a Web site, Web page or other network-accessible content for use in Web filtering operations. The rating information may relate to the appropriateness of the content for a particular audience or audiences, such as for children or for children of different age groups. The rating information is based on feedback provided by users who have accessed the content in question. Where the group of users providing feedback is sufficiently large, the rating assigned to the content will tend to accurately reflect community standards. Also, because the rating information is based on user feedback, the rating information can change over time to reflect changing community attitudes towards content. This represents a significant advance over current Web filtering software that uses rigid algorithms, such as word matching, to determine which content should be blocked.

In particular, a method for generating community-based rating information concerning network-accessible content is described herein. In accordance with the method, user feedback is received from a first user regarding content accessed by the first user over a network. The content may include, for example, a Web site or a Web page. The user feedback may relate, for example, to the appropriateness of the content for children. The user feedback from the first user is analyzed in conjunction with user feedback provided by other users concerning the same content. Community-based rating information concerning the content is then generated based on the analysis. The community-based rating information is then stored for use in the performance of a Web filtering operation that includes either satisfying or denying subsequent user requests for the content.

The foregoing method may further include providing the first user with an interface by which to provide the user feedback as well as displaying a current community-based rating associated with the content via the interface. The foregoing method may also include validating the user feedback provided by the first user or generating an initial rating for the content using an automated software tool. In accordance with the foregoing, method, analyzing the user feedback may include weighting user feedback provided by a user belonging to the same group as the first user heavier than user feedback provided by a user not belonging to the same group as the first user.

A system for generating community-based rating information concerning network-accessible content is also described herein. The system includes a Web server, a rating server coupled to the Web server, and a rating database coupled to the rating server. The Web server is configured to receiver user feedback from a first user regarding content accessed by the first user over a network. The content accessed by the first user may comprise, for example, a Web site or a Web page. The user feedback may relate, for example, to the appropriateness of the content for children. The rating server is configured to analyze the user feedback from the first user in conjunction with user feedback provided by other users concerning the same content and to generate community-based rating information concerning the content based on the analysis. The rating database is configured to store the community-based rating information for use in the performance of a Web filtering operation that includes either satisfying or denying subsequent user requests for the content.

In accordance with the foregoing system, the Web server may be further configured to provide the first user with an interface by which to provide the user feedback. The interface may itself be configured to display a current community-based rating associated with the content. In further accordance with the foregoing system, the rating server may be further configured to validate the user feedback provided by the first user and/or further configured to generate an initial rating for the content using an automated software tool. The rating server may also be configured to weigh user feedback provided by a user belonging to the same group as the first user heavier than user feedback provided by a user not belonging to the same group as the first user in performing the analysis.

A method for performing Web filtering based on community-based content rating information is also described herein. In accordance with the method, a request for network-accessible content is received from a user. The network-accessible content may comprise, for example, either a Web site or a Web page. Community-based rating information associated with requested content is obtained. The community-based rating information may relate, for example, to the appropriateness of the requested content for children. A user-specific Web filtering profile associated with the user requesting the content is also obtained. The community-based rating information is compared to the user-specific Web filtering profile and, based on the results of the comparison, the requested content is either delivered to the user or the request is denied.

A system for performing Web filtering based on community-based content rating information is also described herein. The system includes a ratings database, a filtering profile database, and a Web server connected to the ratings database and the filtering profile database. The Web server is configured to receive a request for network-accessible content from a user. The network-accessible content may comprise, for example, a Web site or a Web page. The Web server is further configured to obtain community-based rating information associated with requested content from the ratings database and to obtain a user-specific Web filtering profile associated with the user requesting the content from the filtering profile database. The community-based rating information may relate, for example, to the appropriateness of the requested content for children. The Web server is still further configured to compare the community-based rating information to the user-specific Web filtering profile, and to either delivering the requested content to the user or denying the request based on results of the comparison.

In accordance with another aspect of the present invention, user-specific Web filtering profiles are generated for one or more users of a client machine. Each Web filtering profile is used to determine what type of network-accessible content will be made available to a particular user when using the client machine. Such an embodiment advantageously enables a parent to allow one user within a household to access certain types of Web sites but to deny another user access to the same types of Web sites. For example, a parent may wish to allow a teenager access to certain types of Web sites but prohibit a toddler from accessing those same Web sites. This represents an advance over conventional Web filtering software, which typically either blocks a Web site or passes a Web site for every user of the machine or network upon which the software is installed.

In particular, a method for generating user-specific Web filtering profiles is also described herein. In accordance with the method, first user-specific Web filtering information concerning a first user of a client machine is received. The first user-specific Web filtering information is analyzed and a first user-specific Web filtering profile is generated therefrom. The first user-specific Web filtering profile is stored for use in the performance of a Web filtering operation that includes either satisfying or denying requests for network-accessible content originating from the user of the client machine.

The foregoing method may further include receiving second user-specific Web filtering information concerning a second user of the client machine. The second user-specific Web filtering information is analyzed and a second user-specific Web filtering profile is generated therefrom. The second user-specific Web filtering profile is stored for use in the performance of a Web filtering operation that includes either satisfying or denying requests for network-accessible content originating from the second user of the client machine.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
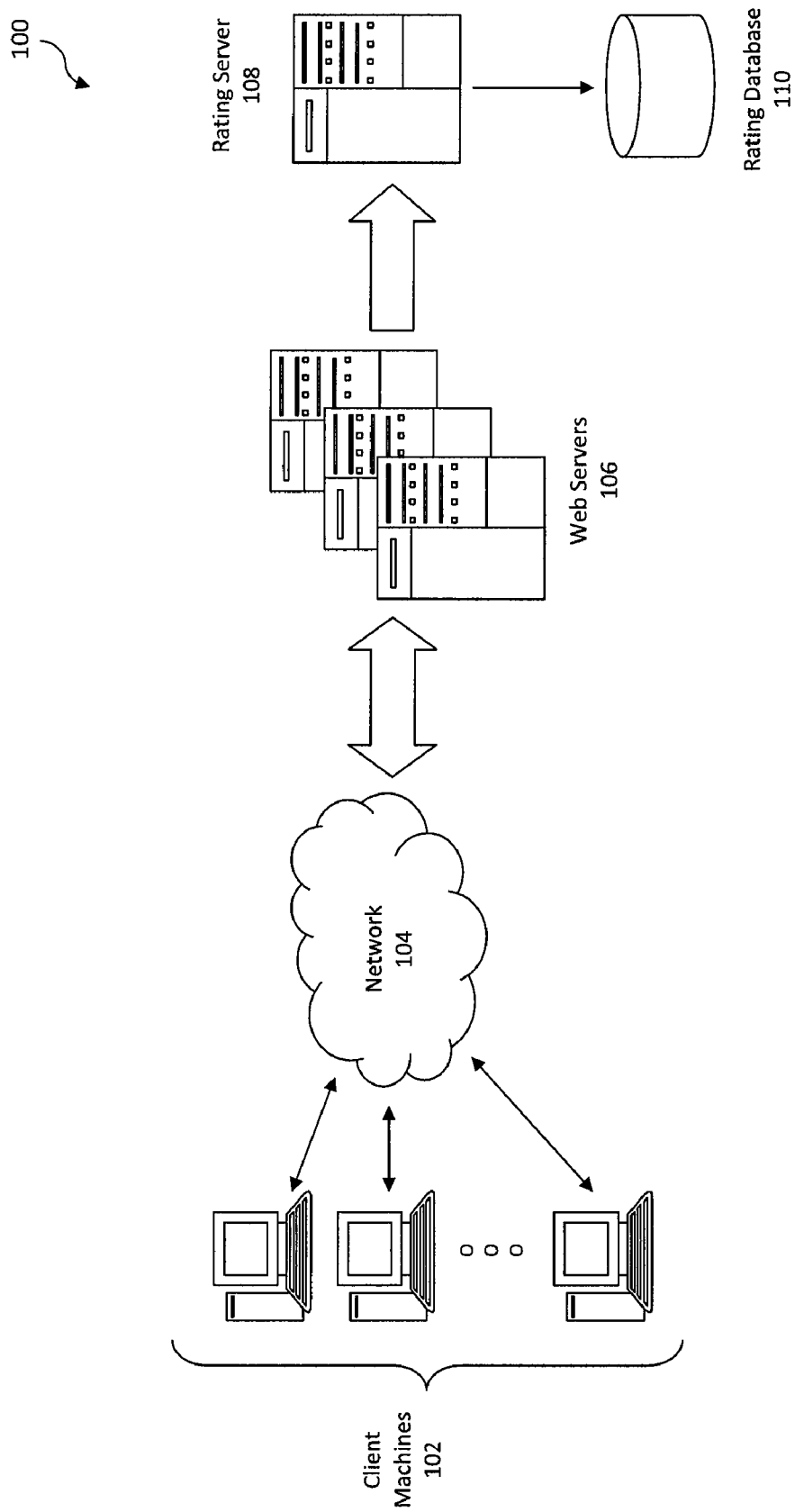
FIG. 1 is a block diagram of a system that generates community-based rating information about a Web site, Web page or other network-accessible content in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Community-Based Web Filtering System

FIG. 1 is a high-level block diagram of a system 100 that comprises one portion of an exemplary community-based Web filtering system in accordance with one embodiment of the present invention. The primary functions of system 100 with respect to the present invention are to obtain feedback about a plurality of Web sites, Web pages or other network-accessible content from a plurality of users, to analyze such feedback to generate community-based rating information for each such Web site, Web page or item of content, and to store such community-based rating information in a database for use in future Web filtering operations, details of which will be described in more detail herein.

As shown in FIG. 1, system 100 includes a plurality of client machines 102 that are communicatively connected to a plurality of Web servers 106 via a network 104. Each client machine 102 is intended to represent a system or device that is configured to execute a Web browser. A user of each client machine 102 may use the Web browser executing on the machine to request and display content made available by Web servers 106 in a well-known manner. Each client machine 102 may comprise a desktop computer, a laptop computer, a handheld computing device, a personal digital assistant (PDA), a cellular phone, a multimedia player, or any other Web-enabled system or device.

Web servers 106 are intended to represent computers configured to accept requests for content from the Web browsers executing on client machines 102 and to serve content responsive to those requests, wherein the content may include, for example, Web pages associated with a Web site. The manner in which such Web servers 106 operate to deliver content to client machines 102 will be well-known to persons skilled in the relevant art(s).

Network 104 is intended to represent the Internet. However, network 104 may also comprise any type of network or combination of networks including wide area networks, local area networks, private networks, public networks, packet networks, circuit-switched networks, and wired or wireless networks. As described above, network 104 operates in part to carry requests for content from client machines 102 to Web servers 106 and to carry requested content from Web servers 106 to client machines 102.

In accordance with an embodiment of the present invention, in addition to displaying content to a user, each client machine 102 is configured to concurrently provide an interface to the user by which the user can provide feedback about the content that is currently being displayed by the client machine. As will be discussed in more detail herein, this interface may comprise a toolbar that is displayed in conjunction with the graphical user interface (GUI) of the Web browser, although the invention is not so limited. The feedback provided by the user via this interface may relate to the appropriateness of the content for a particular audience, such as for children. The feedback provided by the user may also relate to the appropriateness of the content for a plurality of different audiences, such as for children in different age groups.

In further accordance with an embodiment of the present invention, each Web server 106 is configured to receive the user feedback and provide it to a rating server 108. Rating server 108 is a computer that is configured to analyze the user feedback to generate community-based rating information for each Web site or item of content about which feedback has been provided. Rating server 108 is further configured to store such community-based rating information in a rating database 110 for use in future Web filtering operations, details of which will be described in more detail herein. As will be appreciated by persons skilled in the relevant art(s), depending on the scale of the overall system, multiple rating servers 108 and/or multiple rating databases 110 may be used to implement the present invention.

Figure 2:
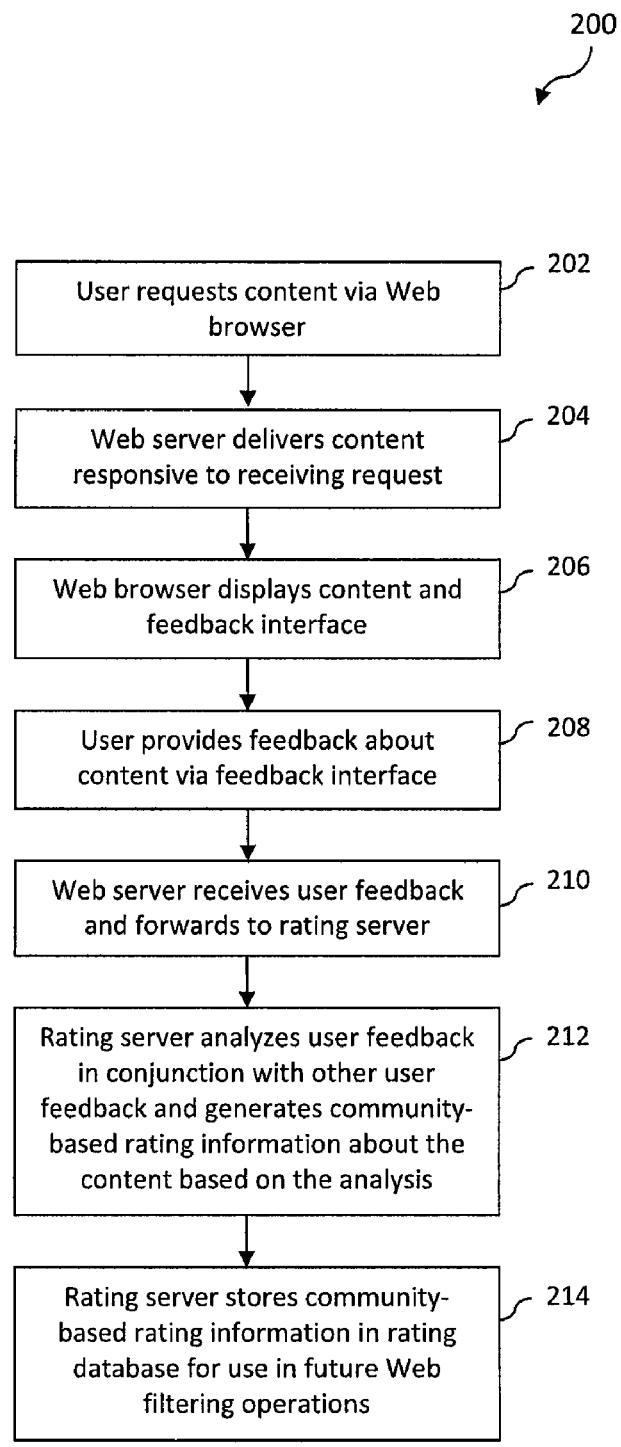
FIG. 2 is a flowchart of one method for generating community-based rating information about a Web site, Web page or other network-accessible content in accordance with an embodiment of the present invention.

FIG. 2 is a flowchart 200 of one method for generating community-based rating information about a Web site, Web page or other network-accessible content in accordance with an embodiment of the present invention. The method of flowchart 200 will be described with continued reference to the elements of system 100 of FIG. 1, although the method is not limited to that embodiment. Based on the teachings provided herein, persons skilled in the relevant art(s) will readily appreciate that the method of flowchart 200 may be implemented using other elements and/or system configurations than those depicted in FIG. 1.

As shown in FIG. 2, the method of flowchart 200 begins at step 202 in which a user of a client machine 102 requests content using a Web browser executing on the client machine. The request is transmitted over network 104 and, at step 204, one of Web servers 106 delivers the requested content to the client machine responsive to receiving the request. At step 206, the Web browser executing on the client machine displays the content along with an interface by which the user can provide feedback about the content. At step 208, the user provides feedback about the content via the interface. As noted above, the feedback may relate to the appropriateness of the content for a particular audience, such as for children, or for a plurality of different audiences, such as for children in different age groups.

At step 210, the Web server that served the content receives the user feedback and forwards it to rating server 108. At step 212, rating server 108 analyzes the user feedback in conjunction with other user feedback provided about the same content and then generates community-based rating information about the content based on the analysis. At step 214, rating server 108 stores the community-based rating information generated in step 212 in rating database 110 for use in future Web filtering operations, which will be described in more detail herein.

Figure 3:
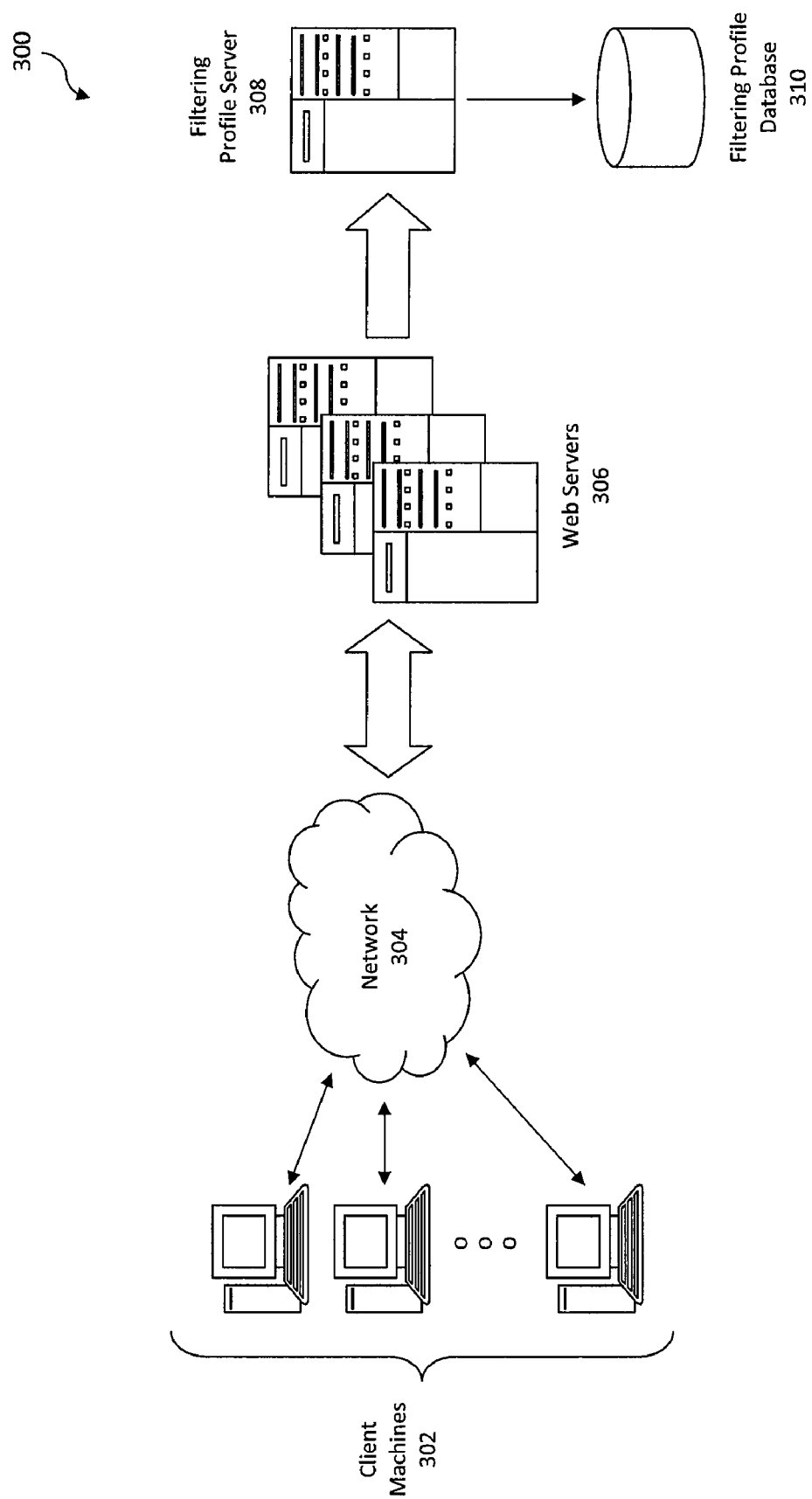
FIG. 3 is a block diagram of a system that generates user-specific Web filtering profiles in accordance with an embodiment of the present invention.

FIG. 3 is a high-level block diagram of a system 300 that comprises another portion of the exemplary community-based Web filtering system described above in reference to system 100 of FIG. 1. The primary functions of system 300 with respect to the present invention are to obtain information concerning the type of content that one or more users of a client machine should be allowed to receive, to use such user-specific Web filtering information to generate a Web filtering profile for each such user of the client machine, and to store the generated user-specific Web filtering profiles in a filtering profiles database for use in future Web filtering operations, the details of which will be described in more detail herein.

As shown in FIG. 3, system 300 includes a plurality of client machines 302 that are communicatively connected to a plurality of Web servers 306 via a network 304. Like client machines 102 shown in system 100 of FIG. 1, each client machine 302 is intended to represent a system or device that is configured to execute a Web browser for displaying network-accessible content. Furthermore, like Web servers 106 shown in system 100 of FIG. 1, Web servers 306 are intended to represent computers configured to accept requests for content from the Web browsers executing on client machines 302 and to serve content responsive to those requests. Network 304 is intended to represent the Internet, although as noted above in the description of network 104, the present invention is not so limited.

In accordance with an embodiment of the present invention, in addition to serving requested content to a user, each Web server 306 is configured to execute a Web application that allows a user of a client machine 302 to provide user-specific Web filtering information to the Web server. This user-specific Web filtering information describes the type of content that one or more users of the client machine should be allowed to receive and/or should not be allowed to receive. For example, a user of a client machine 302 may provide information concerning the type of content that certain members of the user's household should be allowed to receive and/or should not be allowed to receive when accessing content using the client machine. As will be discussed in more detail herein, each user of a client machine may be distinguished using a unique user identifier (ID).

The Web application obtains this user-specific Web filtering information by serving Web pages to the Web browser executing on the client machine, wherein the Web pages are configured to accept user input for transmission back to the Web server. However, as will be described elsewhere herein, other well-known methods for soliciting the user-specific Web filtering information may also be used.

In further accordance with an embodiment of the present invention, each Web server 306 is configured to receive the user-specific Web filtering information and provide it to a filtering profile server 308. Filtering profile server 308 is a computer that is configured to analyze this user-specific Web filtering information and generate Web filtering profiles for each user of a client machine 302 about which such information has been provided. In an embodiment, each Web filtering profile is associated with a unique user ID. Filtering profile server 308 is further configured to store such user-specific Web filtering profiles in a filtering profiles database 310 for use in future Web filtering operations, details of which will be described in more detail herein. As will be appreciated by persons skilled in the relevant art(s), depending on the scale of the overall system, multiple filtering profile servers 308 and/or multiple filtering profiles databases 310 may be used to implement the present invention.

Figure 4:
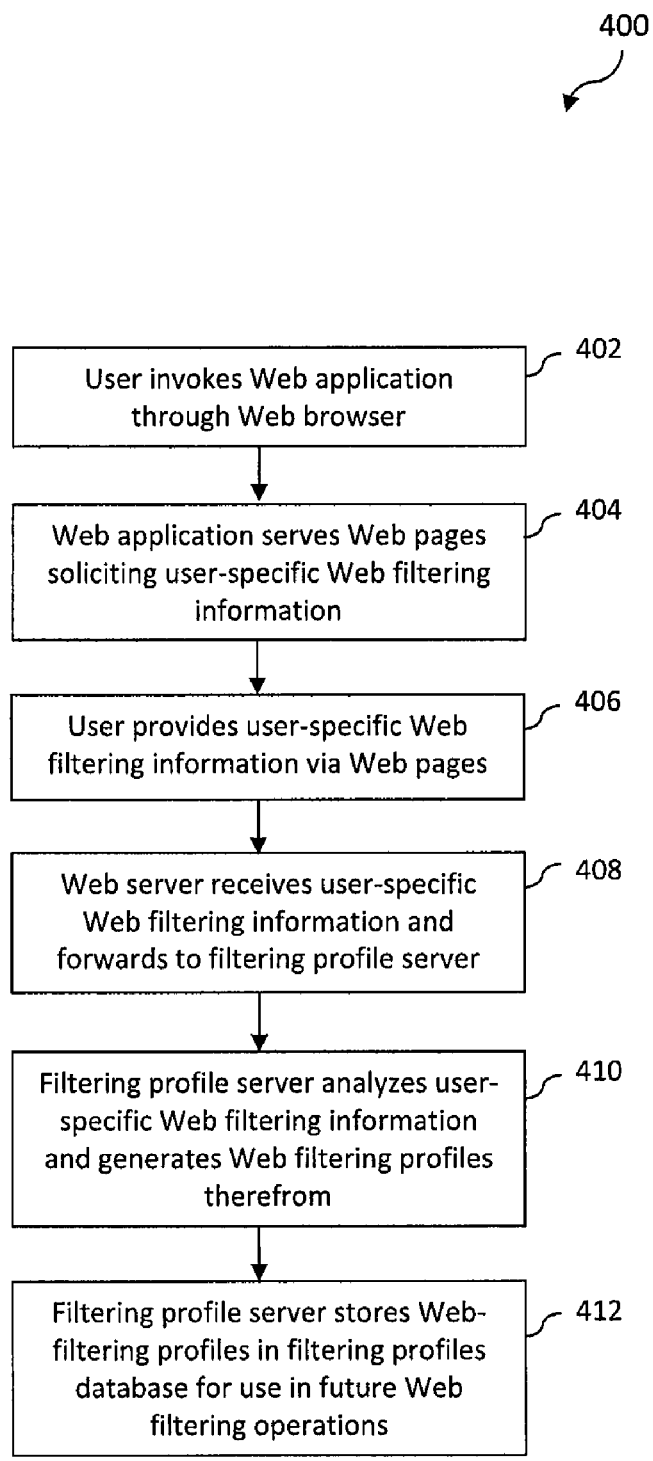
FIG. 4 is a flowchart of one method for generating user-specific Web filtering profiles in accordance with an embodiment of the present invention.

FIG. 4 is a flowchart 400 of one method for generating user-specific Web filtering profiles in accordance with an embodiment of the present invention. The method of flowchart 400 will be described with continued reference to the elements of system 300 of FIG. 3, although the method is not limited to that embodiment. Based on the teachings provided herein, persons skilled in the relevant art(s) will readily appreciate that the method of flowchart 400 may be implemented using other elements and/or system configurations than those depicted in FIG. 3.

As shown in FIG. 4, the method of flowchart 400 begins at step 402 in which a user of a client machine 302 invokes a Web application via a Web browser running on the client machine. Responsive to step 402, the Web application, which executes on one of Web servers 306, serves Web pages soliciting user-specific Web filtering information to the Web browser, as shown at step 404. At step 406, the user provides user-specific Web filtering information via the Web pages. As noted above, this user-specific Web filtering information describes the type of content that one or more users of the client machine should be allowed to receive and/or should not be allowed to receive.

At step 408, the Web server that served the Web pages receives the user-specific Web filtering information and forwards it to filtering profile server 308. At step 410, filtering profile server 308 analyzes the user-specific Web filtering information and then generates user-specific Web filtering profiles therefrom. As noted above, each Web filtering profile may be associated with a unique user ID. At step 412, filtering profile server 308 stores the user-specific Web profiles generated in step 412 in filtering database 310 for use in future Web filtering operations, which will be described in more detail herein.

Figure 5:
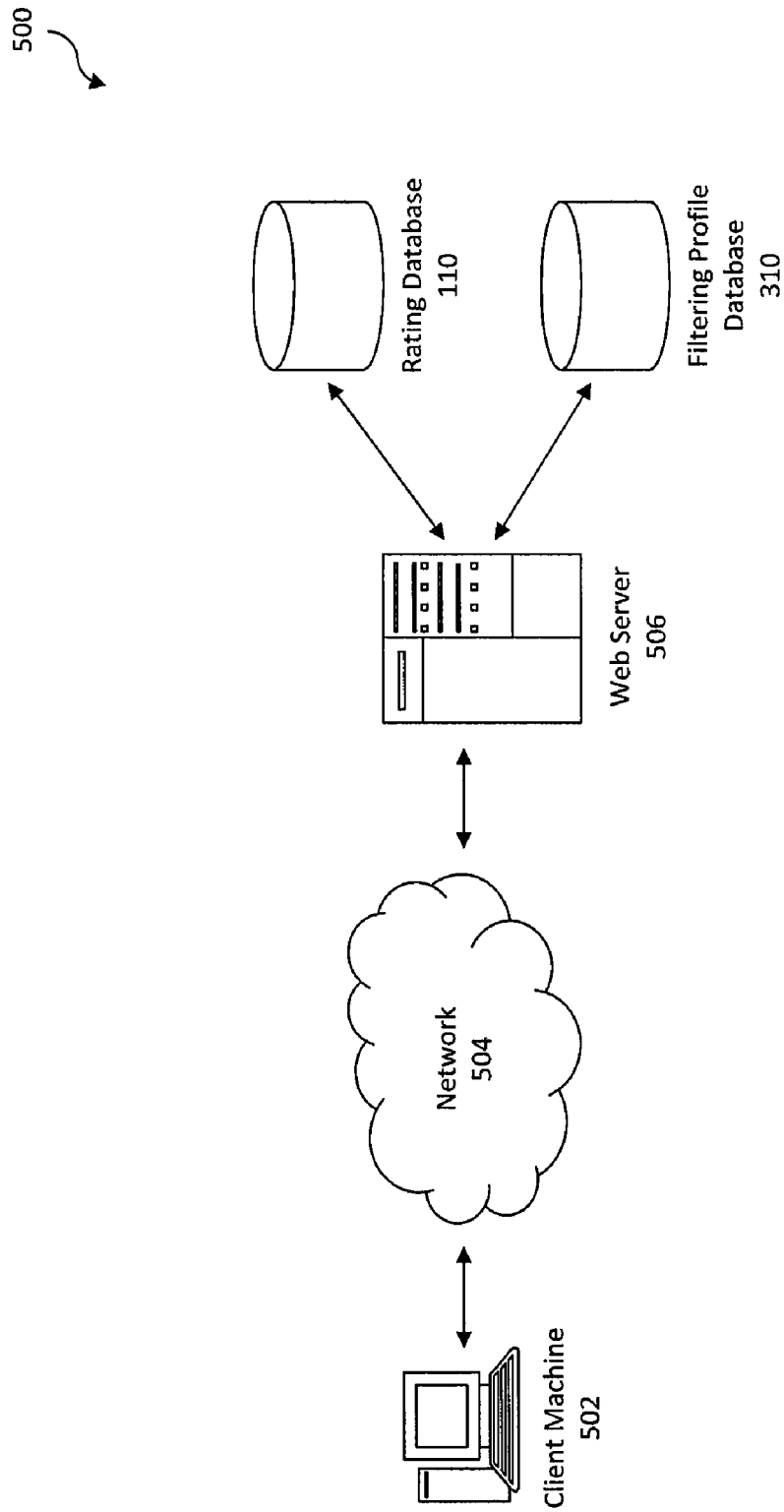
FIG. 5 is a block diagram of a system that performs user-specific Web filtering based on community-based content rating information in accordance with an embodiment of the present invention.

FIG. 5 is a high-level block diagram of a system 500 that comprises another portion of the exemplary community-based Web filtering system described above in reference to system 100 of FIG. 1 and system 300 of FIG. 3. The primary functions of system 500 with respect to the present invention are to receive user requests for content originating from a client machine, to compare community-based rating information associated with the requested content to user-specific Web filtering profile information associated with the user requesting the content, and then based on the results of this comparison, either deliver the requested content to the user or deny the content request.

As shown in FIG. 5, system 500 includes a client machine 502 that is communicatively connected to a Web server 506 via a network 504. Client machine 502 is intended to represent one of client machines 302 described above in reference to FIG. 3 for which user-specific Web profile information was generated. Web server 506 is intended to represent a computer configured to accept requests for content from the Web browser executing on client machine 502 and to serve content responsive to those requests. Network 504 is intended to represent the Internet, although as noted above in the description of network 104 and network 304, the present invention is not so limited.

In accordance with an embodiment of the present invention, in addition to serving requested content, Web server 506 is configured to perform a Web filtering function. In particular, Web server 506 is configured to obtain community-based rating information associated with content requested by a user of client machine 502 from rating database 110, which was described above in reference to system 100 of FIG. 1. Web server 506 is further configured to obtain a user-specific Web filtering profile associated with the user requesting the content from filtering profile database 310, which was described above in reference to system 300 of FIG. 3. Web server 506 is still further configured to compare the community-based rating information associated with the requested content to the user-specific Web filtering profile associated with the user requesting the content, and then based on the results of this comparison, either deliver the requested content to the user of client machine 502 or deny the content request.

In order to perform the foregoing functions, Web server 506 must be capable of determining the identity of the user of client machine 502 that is requesting the content. To that end, client machine 502 may be configured to require the user to complete a login process in order to access content over network 504. This login process may include the user providing a unique user ID that is transmitted to Web server 506 and is used during an online session to uniquely identify requests originating from the user. Client machine 502 may be likewise configured to provide or otherwise expose information to Web server 506 that indicates that client machine 502 should be subject to Web filtering but that no login information has been provided. In this case, Web server 506 may utilize some default form of Web filtering that is not associated with any particular user profile.

Figure 6:
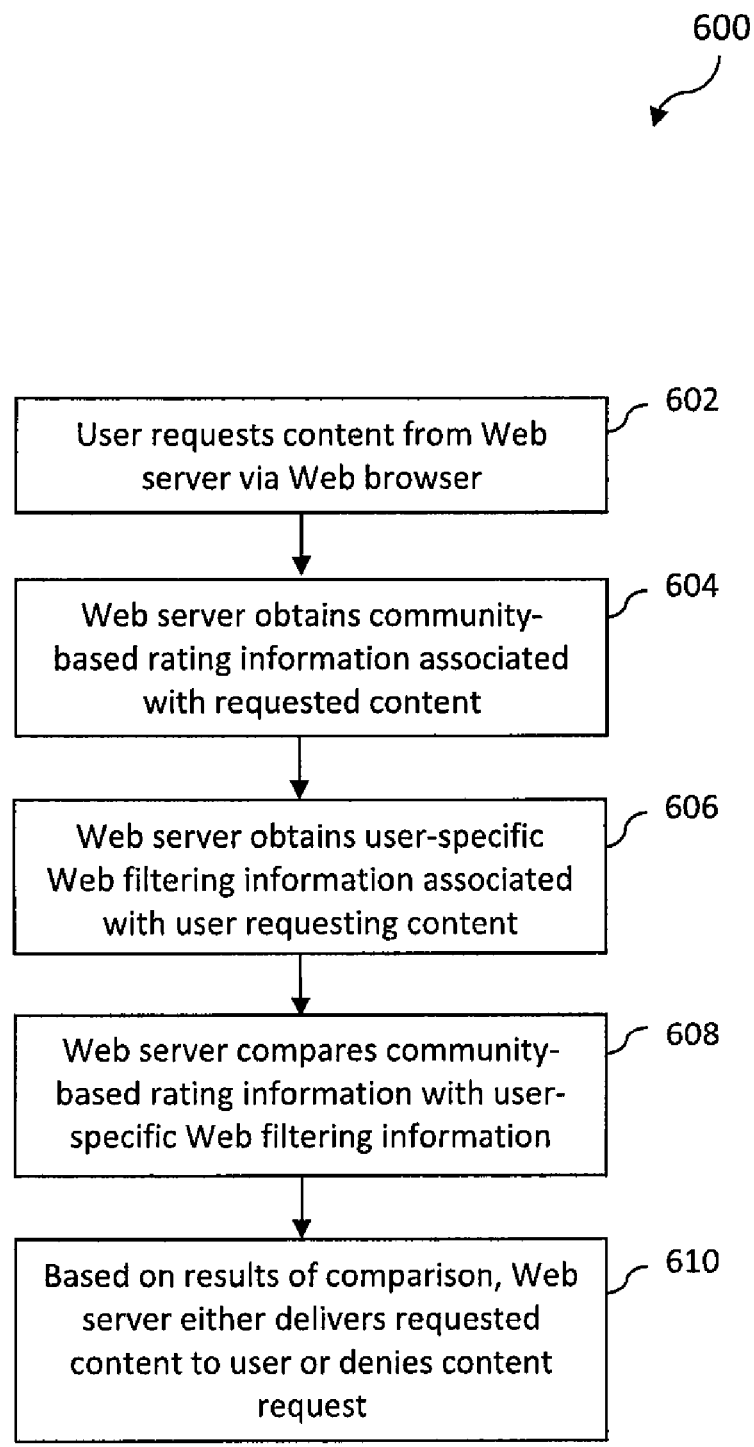
FIG. 6 is a flowchart of one method for performing user-specific Web filtering based on community-based content rating information in accordance with an embodiment of the present invention.

FIG. 6 is a flowchart 600 of one method for performing user-specific Web filtering based on community-based content rating information in accordance with an embodiment of the present invention. The method of flowchart 600 will be described with continued reference to the elements of system 500 of FIG. 5, although the method is not limited to that embodiment. Based on the teachings provided herein, persons skilled in the relevant art(s) will readily appreciate that the method of flowchart 600 may be implemented using other elements and/or system configurations than those depicted in FIG. 5.

As shown in FIG. 6, the method of flowchart 600 begins at step 602 in which a user of client machine 502 requests content from Web server 506 via a Web browser executing on client machine 502. At step 604, Web server 506 receives the content request and obtains community-based rating information associated with the requested content from rating database 110. At step 606, Web server 506 obtains a user-specific Web filtering profile associated with the user requesting the content from rating database 310. To perform this function, Web server 506 may obtain a unique ID associated with the user from client machine 502 (e.g., via a login process or by some other means) and then use this unique ID to obtain the user-specific Web filtering profile. At step 608, Web server 506 compares the community-based rating information obtained from rating database 110 with the user-specific Web filtering profile obtained from rating database 310. At step 610, Web server 506 either delivers requested content to user or denies content request based on the results of the comparison made in step 608.

In an alternative mode of operation now shown in flowchart 600, if Web server 506 determines that client machine 502 should be subject to Web filtering but that certain login information has not been provided, Web server 506 may utilize some default form of Web filtering that is not associated with any particular user profile.

The community-based Web filtering system described above in reference to FIGS. 1-6 has been presented at a high level. Various implementation details regarding each portion of the system will be described below. These implementation details are provided by way of example only and are not intended to limit the present invention. Furthermore, the system described above in reference to FIGS. 1-6 represents only a single exemplary embodiment of the present invention. Other implementations that differ significantly in terms of structure, function, and operation may be used to practice the present invention. Some of these alternative implementations will also be described below.

B. Generation of Community-Based Content Rating Information

As discussed above, an embodiment of the present invention generates community-based rating information about a Web site, Web page or other network-accessible content for use in Web filtering operations. The rating information relates to the appropriateness of the content for a particular audience or audiences, such as for children or for children of different age groups. The rating information is based on feedback provided by users who have accessed the content in question. Where the group of users providing feedback is sufficiently large, the rating assigned to the content will tend to accurately reflect community standards. Also, because the rating information is based on user feedback, the rating information can change over time to reflect changing community attitudes towards content. This represents a significant advance over current Web filtering software that uses rigid algorithms, such as word matching, to determine which content should be blocked.

One approach to the generation of such community-based rating information was described above in reference to FIGS. 1 and 2. Various implementation details regarding this approach will be described below. These implementation details are provided by way of example only and are not intended to limit the present invention. Furthermore, the system and method described above in reference to FIGS. 1 and 2, respectively, each represent only a single exemplary embodiment of the present invention. Other implementations that differ significantly in terms of structure, function, and operation may be used to practice the present invention. Some of these alternative implementations will also be described below.

1. User Feedback Interface Implementation

As discussed above in reference to system 100 of FIG. 1, user feedback may be solicited via a feedback interface that is available to a user as the user browses a Web page or reviews other content. In one embodiment of the present invention, the feedback interface consists of, or is part of, a toolbar that is integrated with the Web browser executing on a client machine. The toolbar may be downloaded to the client machine from a Web server and then installed as a plug-in to the Web browser. For example, the toolbar may be implemented as an ActiveX control.

The toolbar may be configured to receive user feedback in the form of structured information, unstructured information, or both. Structured information may include an indication or categorical description of the type of content that may be contained on a Web site or Web page. For example and without limitation, a user may be asked to indicate whether a Web site or Web page includes any of the following types of content: profanity, sexually explicit content, pornography, violence, bigotry, hate speech, promotion of gambling, promotion of drug use, or promotion of alcohol consumption. The quantity or degree of a particular type of content may also be obtained from a user.

Additionally, the user may be asked to provide feedback about which age groups the content of a Web site or Web page is appropriate for. Such age groups may be delineated using various descriptors including age ranges, education level (e.g., "pre-kindergarten," "grades 1-2", or the like), or other descriptions (e.g., "toddlers," "pre-teens," "teenagers," or the like).

Figure 7:
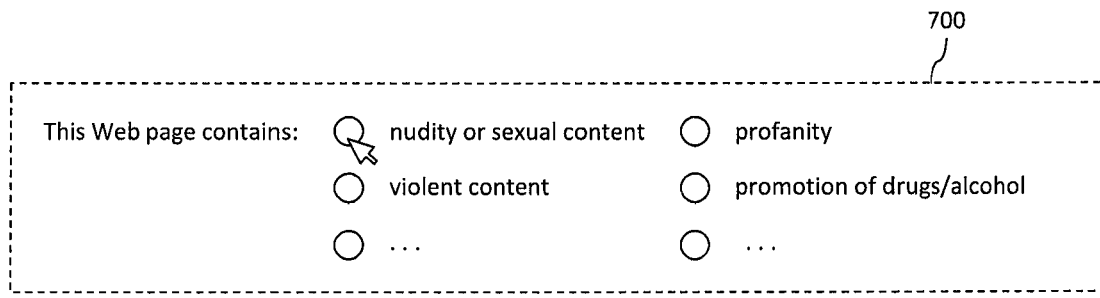
FIG. 7 depicts a portion of a toolbar that uses radio buttons to solicit information regarding the type of content contained on a Web page in accordance with an embodiment of the present invention.
Figure 8:
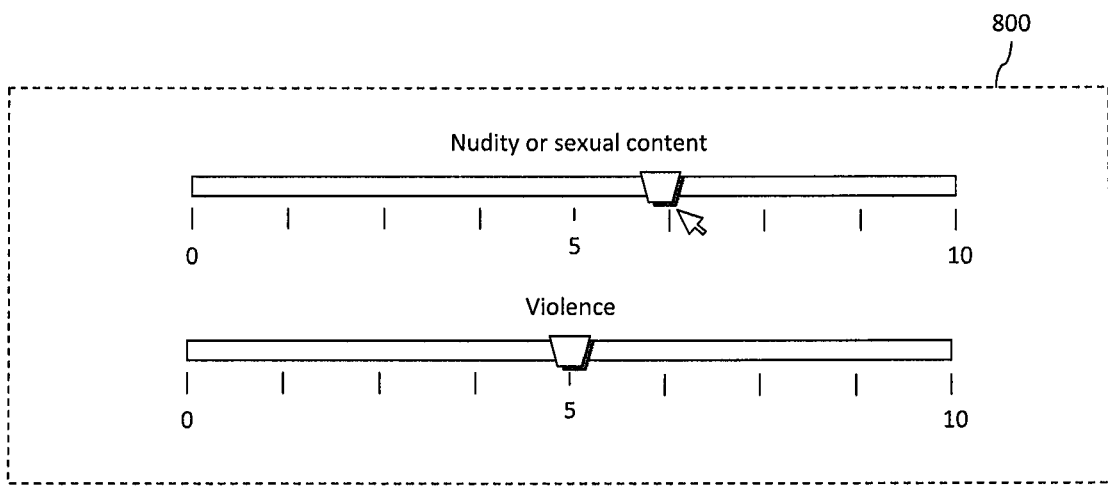
FIG. 8 depicts a portion of a toolbar that includes sliders for indicating a degree of sexual content and violence on a Web site or Web page in accordance with an embodiment of the present invention.
Figure 9:
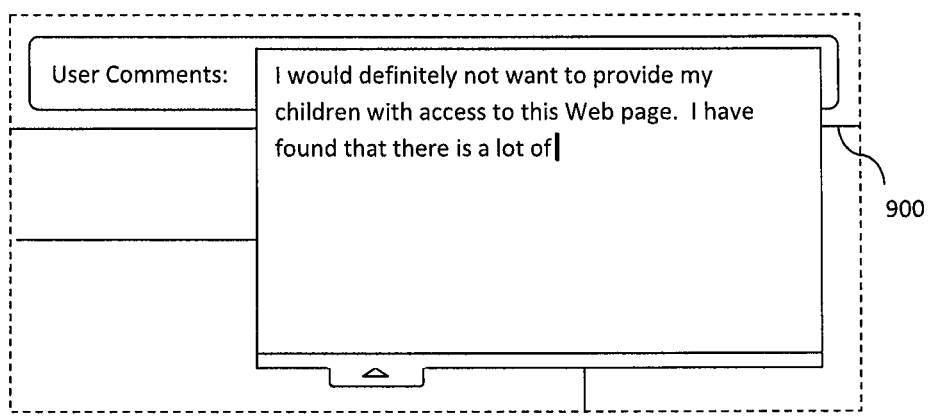
FIG. 9 depicts a portion of a toolbar that provides a drop-down area for accepting user comments about or a description of the content of a Web site or Web page in accordance with an embodiment of the present invention.

Structured information such as that described immediately above may be obtained using various well-known GUI tools. For example, checkboxes, radio buttons, sliders, or dropdown menus may be used to allow a user to indicate the type of content contained on a Web page or Web site, the quantity or degree of a type of content on a Web page or Web site, or the age group or age group(s) for whom such content is appropriate. For example, FIG. 7 depicts a portion of a toolbar 700 that solicits the type of content contained on a Web page using radio buttons while FIG. 8 depicts a portion of a toolbar 800 that includes sliders for indicating the degree of sexual content and violence on a Web site or Web page, where the degree is measured using a ranking from 0 to 10. The toolbar may also be configured to accept unstructured data from the user, such as comments about or a description of the content of a Web site or Web page as input by the user using a keyboard or keypad. To accommodate the text input, the toolbar may provide an expandable or dropdown area for accepting such text, as depicted in the portion of toolbar 900 depicted in FIG. 9.

Figure 10:
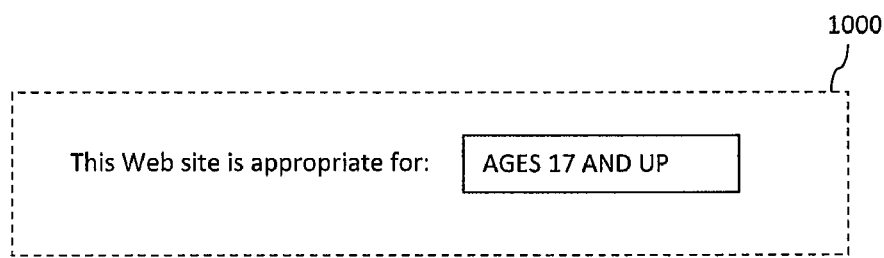
FIG. 10 shows a portion of a toolbar that displays a current community-based content rating in accordance with an embodiment of the present invention.
Figure 11:
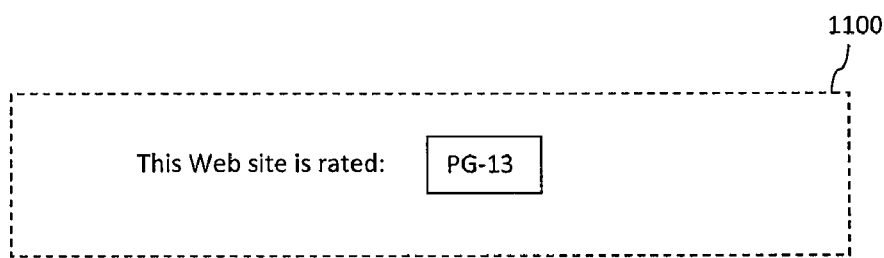
FIG. 11 shows a portion of a toolbar that displays a current community-based content rating similar to that used by the Motion Picture Association of America for rating movies in accordance with an embodiment of the present invention.
Figure 12:
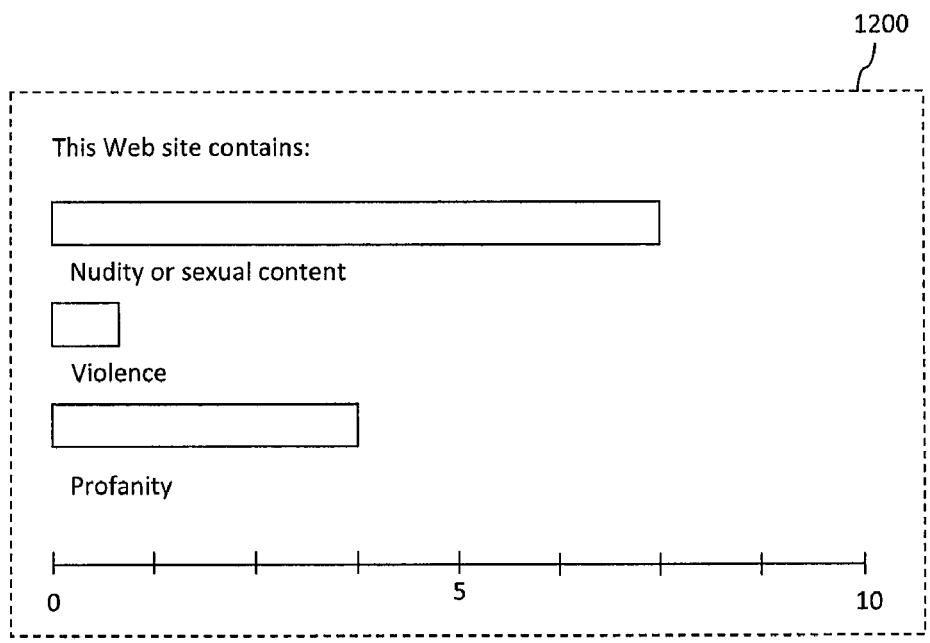
FIG. 12 shows a portion of a toolbar that uses a bar chart to illustrate the quantity or degree of certain types of content contained on a Web site as determined by community-based rating information in accordance with an embodiment of the present invention.

The toolbar may also display information about the community-based rating that currently applies to the Web site, Web page or other content. The appearance of such information will depend in part on the rating system that is used by the system. For example, FIG. 10 shows a portion of a toolbar 1000 that indicates the current community-based rating using a text description of the ages for which the content is appropriate ("ages 17 and up"). FIG. 11 shows a portion of a toolbar 1100 that indicates the current community-based rating using an alphanumeric system similar to that used by the Motion Picture Association of America for rating movies. FIG. 12 shows a portion of a toolbar 1200 that uses a bar chart to illustrate the quantity or degree of certain types of content contained on a Web site as determined by community-based rating information. Of course, these examples are provided for illustrative purposes only and are not intended to limit the present invention. Persons skilled in the relevant art(s) will readily appreciate that numerous other types of systems may be used to rate content and that numerous other methods may be used to display content rating information to a user.

In an embodiment of the present invention, in order to download and use the toolbar, a user of a client machine must sign up for or subscribe to a particular service. In accordance with a further embodiment of the present invention, the user must complete a login procedure in order to access the toolbar during a Web browsing session on the client machine. The login procedure may be executed from code that is downloaded and stored on the client machine or may be managed by a remote server as part of an on-line process. In one embodiment of the present invention, during this login procedure, the user provides a remote server with a unique user ID that is subsequently used to perform user-specific Web filtering as will be described elsewhere herein.

Although the user feedback interface has been described in this section as a toolbar, the invention is not limited to that implementation and numerous other interfaces and techniques may be used to solicit user feedback as will be appreciated by persons skilled in the relevant art(s). For example, periodically-generated pop-up windows may be used to request user feedback about content that a user is currently viewing.

2. Initialization of Content Rating Information

New Web sites, Web pages and other content appear on the Web all the time. Until community-based user feedback is received about such content, this content will be unrated. However, as described elsewhere herein, content rating information is required in order to perform Web filtering operations. An embodiment of the present invention addresses this issue by using conventional Web filtering software and/or other automated tools to provide an initial rating to the content. This initial rating can then be modified or overridden by rating information generated using user-provided feedback when it becomes available.

Figure 13:
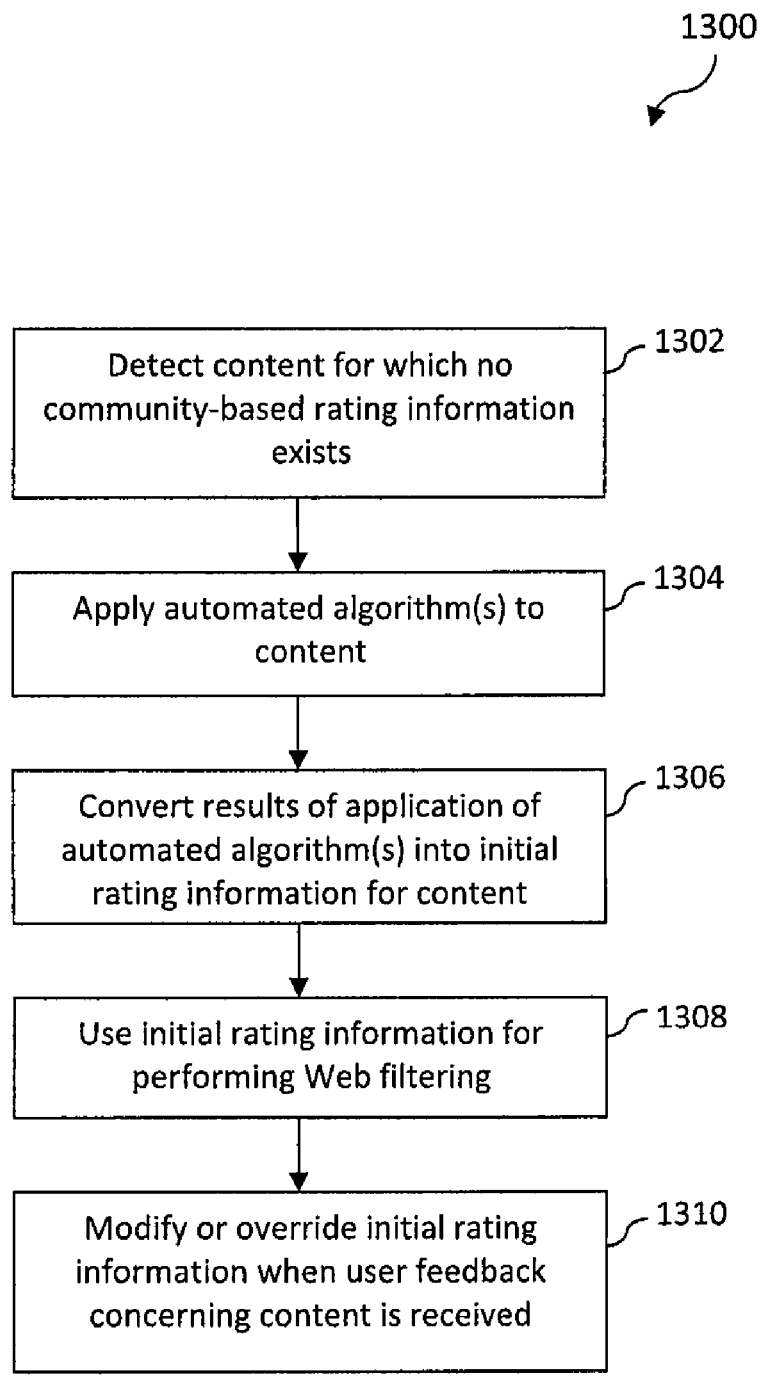
FIG. 13 depicts a flowchart of a method for generating and using initial rating information for a Web site, Web page or other network-accessible content in accordance with an embodiment of the present invention.

FIG. 13 depicts a flowchart 1300 of a method for generating and using initial rating information for a Web site, Web page or other network-accessible content in accordance with an embodiment of the present invention. The method of flowchart 1300 may be performed, for example, by rating server 108, although the invention is not so limited.

As shown in FIG. 13, the method of flowchart 1300 begins at step 1302, in which a Web site, Web page or other network-accessible content is detected for which no community-based rating information yet exists. At step 1304, responsive to detecting the content, one or more automated algorithms are applied to the content. These automated algorithms may comprise "off-the-shelf" Web filtering software such as that described in the Background section of the present application. Such software typically works using basic word matching techniques. These automated algorithms may also include proprietary tools for analyzing network-accessible content, such as proprietary tools used for performing filtered Web searches or proprietary image recognition technology.

At step 1306, the results of the application of the automated algorithm(s) are converted or mapped into initial rating information for the content that can be used for Web filtering operations and for display to a user.

At step 1308, the initial rating information is used to perform Web filtering operations, such as Web filtering operations that are described elsewhere herein. The initial rating information may also be displayed to users via a feedback interface such as the toolbar described above. The initial rating information is used until such time as community-based rating information is available, as described below in reference to step 1310.

At step 1310, the initial rating information is modified or overridden when user feedback concerning the content is actually received. This step may comprise replacing the initial rating information with community-based rating information derived from user feedback when it is available, or it may comprise combining the initial rating information with community-based rating information derived from user feedback when it is available. The combination may be carried out in a manner that places a greater or lesser weight on the initial rating information depending upon some measure of the perceived reliability of the community-based rating information.

Where the initial rating information is displayed in a toolbar or other GUI, the GUI may indicate to the user that the current rating is not based on user feedback and may further solicit feedback based on this fact. For example, the GUI may display a statement such as "This Web site/Web page has not yet been reviewed by a user—be the first to submit a review."

3. Validation of Content Rating Information

Because a Web filtering system in accordance with an embodiment of the present invention relies on user feedback to generate rating information about network-accessible content, the reliability of the system is tied to the reliability of the feedback provided by users. Where the user feedback that has been provided is sparse, feedback from only a few users can radically affect the community-based rating information. This is undesirable, particularly in cases where user feedback originates from an unreliable source. The unreliable source may be, for example, a group of users that have colluded to provide feedback about content, wherein the feedback misrepresents the actual nature of the content being reviewed. As another example, the unreliable source may be a person or persons with views that are radically different than the rest of the community.

In order to address this issue, an embodiment of the present invention utilizes one or more techniques for validating community-based rating information associated with network-accessible content. For example, FIG. 14 depicts a flowchart 1400 of a technique for validating community-based rating information in accordance with one embodiment of the present invention.

Figure 14:
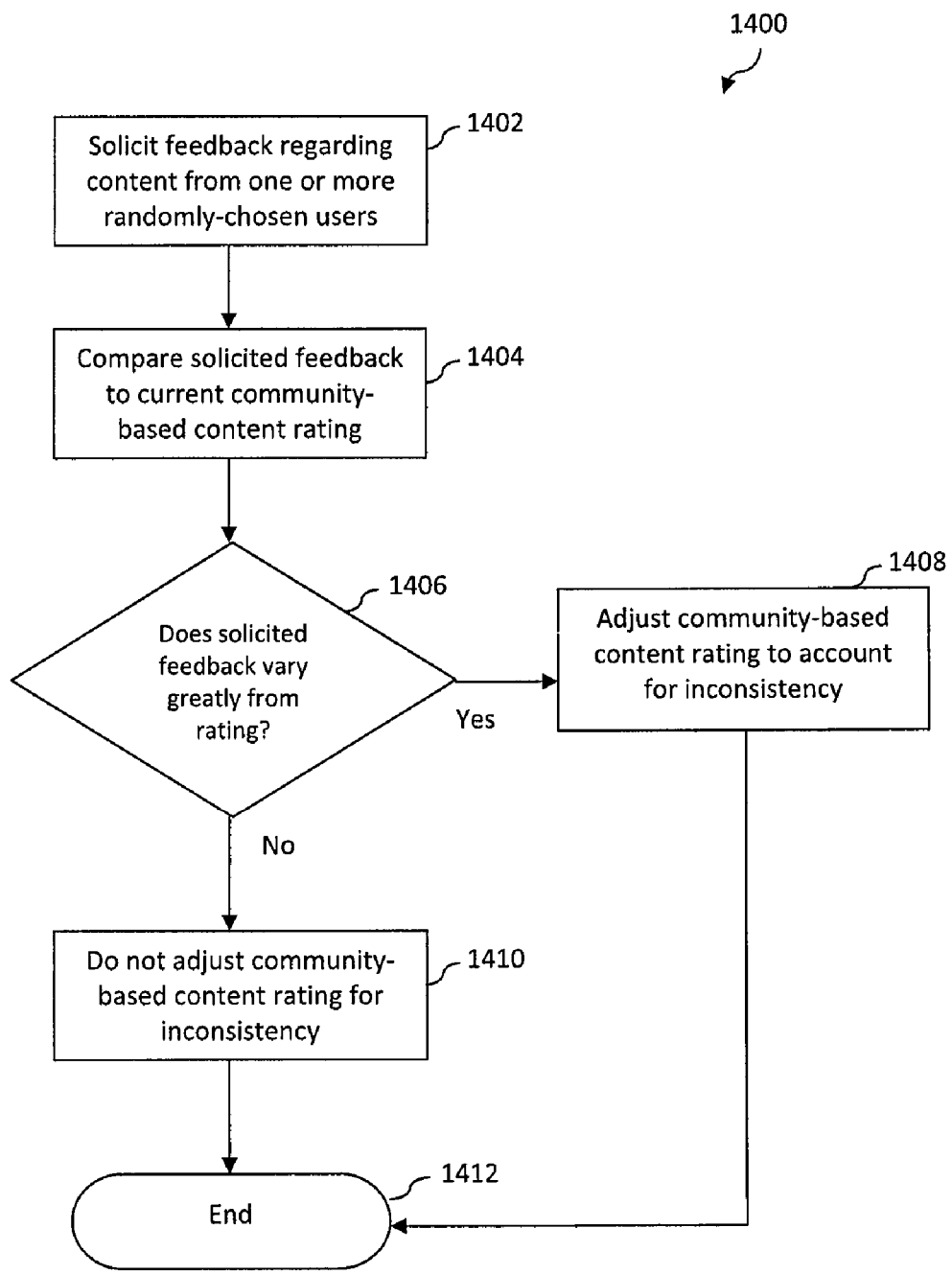
FIG. 14 depicts a flowchart of a method for validating community-based rating information in accordance with one embodiment of the present invention.

As shown in FIG. 14, the method begins at step 1402, in which the system solicits feedback concerning network-accessible content from one or more randomly-chosen users. At step 1404, the system compares the solicited feedback to the current community-based rating information for the same content. At decision step 1406, it is determined whether the solicited feedback varies greatly from the community-based rating information. If there is a great variance, then this is an indication that the current community-based rating information may be invalid and the rating information is adjusted accordingly as shown at step 1408. However, if the solicited feedback information does not vary greatly from the current community-based rating information, then this is an indication that the current community-based rating information is valid and the rating information is not adjusted to account for any inconsistency as shown at step 1410 (although the solicited feedback may be used to update the community-based rating information in a normal fashion). In either case, processing then ends as shown at step 1412.

A method such as the method of flowchart 1400 would make it very difficult, for example, for malicious users to collude to provide uniformly positive ratings about a site that is not appropriate for children. This method may be implemented in a variety of ways. For example, as discussed elsewhere herein, an embodiment of the present invention requires the user of a client machine to complete a login procedure to provide user feedback about network-accessible content and/or to configure or invoke Web filtering features. In accordance with a further embodiment of the present invention, if the user that logs in is identified as a person authorized to review all types of content, then a remote server causes a selected Web site, Web page, or other content to appear in the user's Web browser and solicits feedback from the user about that content. This solicited feedback is then used to validate the current community-based rating associated with the content. However, this is only one example of how such a method may be implemented and thus this example should not be used to limit the present invention.

Another method that may be used to validate rating information when user feedback is sparse is to compare user feedback with a rating generated via the application of one or more automated algorithms to the content. Such automated algorithms may comprise "off-the-shelf" Web filtering software such as that described in the Background section of the present application or proprietary tools for analyzing network-accessible content, such as proprietary tools used for performing filtered Web searches or proprietary image recognition technology. If the user feedback varies greatly from the results generated by the automated algorithms, then such feedback may receive less weight or be ignored entirely.

Furthermore, in accordance with one embodiment of the present invention, user feedback may be combined with results generated by such automated algorithms to generate a rating that is partially based on user feedback and partly based on automated tools. How the user feedback and the results generated by the automated algorithms are weighted in performing the combination may vary depending upon the implementation.

In accordance with another embodiment of the present invention, the system is configured to identify users whose feedback is generally inconsistent with the feedback provided by the rest of the user community. Feedback received from these users about content is then accorded a lesser weight than feedback received from other users that have not been so identified when generating community-based rating information. This may be thought of as a "system for rating the raters."

4. Group-Related Ratings Generation

As noted above, an embodiment of the present invention may be used to generate community-based ratings of Web sites, Web pages and other network-accessible content that relate to the general appropriateness of such content for children or for children in different age groups. However, the invention is not limited to this application. Rather, an embodiment of the present invention may allow for a more tailored definition of what constitutes appropriate material. For example, some parents may object to science Web sites, while other parents may object to Web sites that applaud George Bush. An embodiment of the present invention facilitates the creation of user communities that represent groups of reviewers having similar sensibilities. Web-filtering installations registered to a member of the group will give more weight to user feedback from other members in the group. Over time, the system may learn the preferences of the group and then apply the group's standards to content that the group has not yet rated.

In one embodiment, group membership is driven by the user. That is to say, the user actually registers with or subscribes to a particular group. After such registration or subscription, the user's feedback is weighted more heavily when generating community-based rating information for members of that group than when generating community-based rating information for non-members. Likewise, after such registration or subscription, feedback provided by other members of the group will be weighted more heavily when generating community-based rating information for the new member. As a consequence of this implementation, there will not be one community-based rating for an item of network accessible content, but a plurality of group-specific community-based ratings. Which rating is displayed to a particular user and/or is used for performing Web filtering will depend on which, if any, groups the user belongs to.

In another embodiment, group membership is driven by the system. That is to say, the user never registers with or subscribes to a particular group, but instead is placed in a group by the system based on a correlation between feedback provided by the user and feedback provided by the members of the group. In this manner, the system can flexibly grow user communities of users having like sensibilities. These sensibilities may be rooted in any number of factors, including but not limited to age, upbringing, education, profession, religious affiliation and/or community standards. Depending on the implementation, the user may or may not be informed that he/she has been placed in such a group. As in the previously described embodiment, as a consequence of this implementation, there will not be one community-based rating for an item of network accessible content, but a plurality of group-specific community-based ratings. Which rating is displayed to a particular user and/or is used for performing Web filtering will depend on which, if any, groups the user belongs to.

5. User Recommendations

In accordance with another embodiment of the present invention, feedback provided by a first user may be correlated with feedback provided by one or more additional users so as to provide the first user with recommendations concerning individual Web sites, Web pages, or other network-accessible content.

For example, in one embodiment, when a first user provides feedback about an item of content, the system identifies one or more additional users that provided similar feedback and then makes an affinity-based recommendation of other content based on feedback provided by the additional user(s). Thus, for example, a GUI may be displayed in conjunction with the first user's Web browser that states that "Parents who liked this Web site also liked:" followed by a list of additional Web sites approved of by the additional users.

B. Generation of User-Specific Web Filtering Profiles

As discussed above, an embodiment of the present invention generates user-specific Web filtering profiles for one or more users of a client machine. Each Web filtering profile is used to determine what type of network-accessible content will be made available to a particular user when using the client machine. Such an embodiment advantageously enables a parent to allow one user within a household to access certain types of Web sites but to deny another user access to the same types of Web sites. For example, a parent may wish to allow a teenager access to certain types of Web sites but prohibit a toddler from accessing those same Web sites. This represents an advance over conventional Web filtering software, which typically either blocks a Web site or passes a Web site for every user of the machine or network upon which the software is installed.

One approach to the generation of such user-specific Web filtering profiles was described above in reference to FIGS. 3 and 4. Various implementation details regarding this approach will be described below. These implementation details are provided by way of example only and are not intended to limit the present invention. Furthermore, the system and method described above in reference to FIGS. 3 and 4, respectively, each represent only a single exemplary embodiment of the present invention. Other implementations that differ significantly in terms of structure, function, and operation may be used to practice the present invention. Some of these alternative implementations will also be described below.

1. Web Filtering Profile Generation

In the system described above in reference to FIG. 3, each Web server 306 is configured to execute a Web application that allows a user of a client machine 302 to provide user-specific Web filtering information to the Web server. Each Web server 306 is further configured to receive the user-specific Web filtering information and provide it to a filtering profile server 308. Filtering profile server 308 is configured to analyze this user-specific Web filtering information and generate Web filtering profiles for each user of a client machine 302 about which such information has been provided. Filtering profile server 308 is further configured to store such user-specific Web filtering profiles in a filtering profiles database 310 for use in future Web filtering operations.

Figure 15:
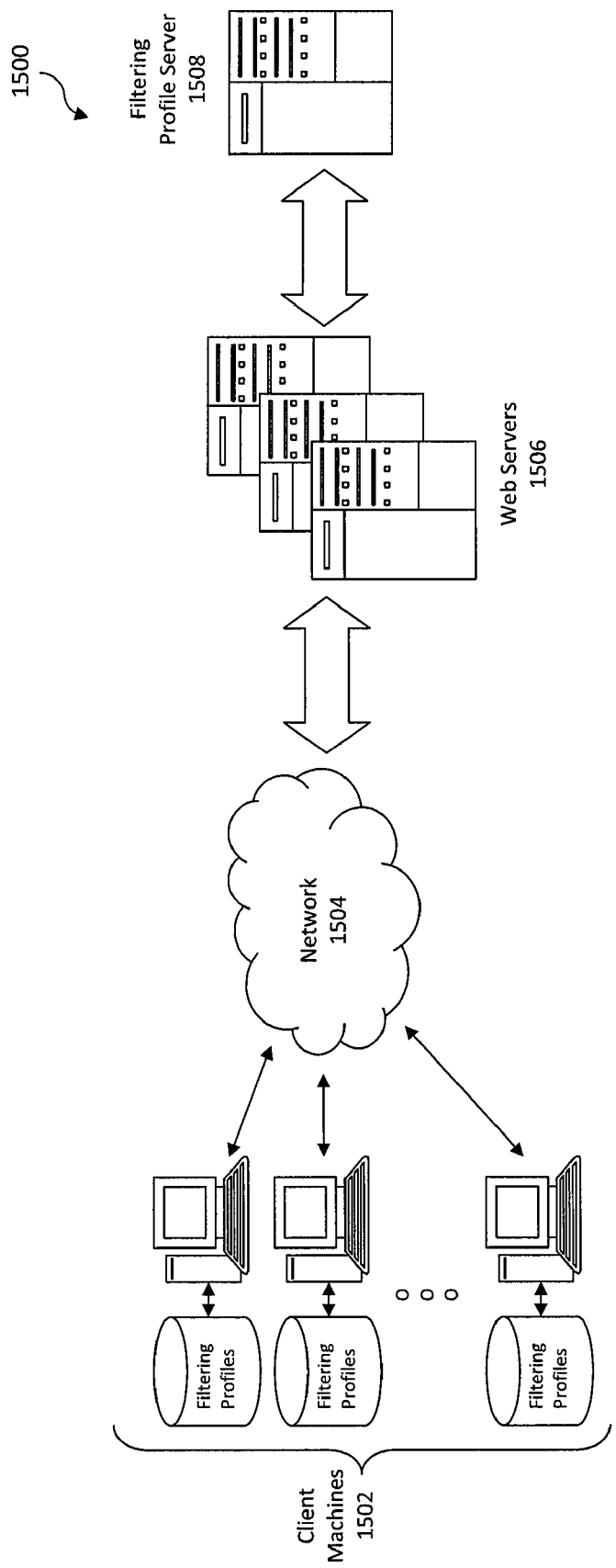
FIG. 15 is a block diagram of a system that generates community-based rating information about a Web site or other network-accessible content in accordance with an alternate embodiment of the present invention.

In an alternate embodiment of the present invention, the Web filtering profiles associated with a client machine are not stored in a filtering profiles database 310 as shown in FIG. 3, but are instead stored in local memory of the client machine. This is depicted in system 1500 of FIG. 15. As shown in FIG. 15, each client machine 1502 includes a local memory in which Web filtering profiles are stored. This local memory may comprise for example, a hard drive of the client machine. When the Web filtering profiles are needed to perform Web filtering operations as described elsewhere herein, they may be accessed from the client machine itself rather than from a dedicated filtering profiles database such as filtering profiles database 310 of FIG. 3.

In a further alternate embodiment of the present invention, the functions of analyzing user-specific Web filtering information and generating Web filtering profiles for each user of a client machine (attributed to filtering profile server 308 in FIG. 3) are performed by software located on each client machine rather than on a remote server. For example, such software may be downloaded to the client machine upon joining or subscribing to a Web filtering service.

In a still further embodiment of the present invention, the functions of facilitating the provision of user-specific Web filtering information by the user of a client machine (attributed to Web servers 306 of FIG. 3) are performed by software located on each client machine rather than on a remote server. For example, such software may be downloaded to the client machine upon joining or subscribing to a Web filtering service.

Thus, in accordance with the foregoing, the provision of user-specific Web filtering information by the user, the analysis of that information to generate Web filtering profiles, and the storage of the generated Web filtering profiles may each be accomplished off-line by a client machine rather than in an on-line fashion as described above in reference to system 300 of FIG. 3. The assignment of each of these functions to a client machine or to a server is a matter of design choice.

2. Web Filtering Profile Attributes

Depending upon the implementation, the Web filtering profiles used by an embodiment of the present invention may be associated with a client machine only, or with individual users of a client machine. In the former case, a single Web filtering profile is used for a client machine. The Web filtering profile specifies what type of content should be blocked and what type of content should be passed when Web filtering has been activated for that client machine. In the latter case, each user of the client machine has a separate user-specific Web filtering profile. The user-specific Web filtering profile is used to determine what type of content should be blocked and what type of content should be passed when the user is using the client machine. The user-specific Web filtering profile may be associated with the user through the use of a unique user ID.

Each Web filtering profile may itself be very simple or very complex. For example, a Web filtering profile may simply designate whether a user should or should not be allowed access to content that is inappropriate for children. Then rated content is then essentially placed either on a "white list" (a list of content that is appropriate for children) or a "black list" (a list of content that is not appropriate for children). Only authorized users (e.g., users providing a particular user ID and password) may access content on the black list.

As another example, a Web filtering profile may state that a user should only be allowed access to content that is appropriate for a certain age group or age group(s). As a still further example, a Web filtering profile may state that a user is allowed to see one type of content (e.g., violent content) but should be prevented from seeing another type of content (e.g., sexual content). Distinctions based on the degree of a particular type of content may also be made. In order to be useful, a profile must include criteria that correlates to the community-based content rating system used to implement Web filtering. For example, a Web filtering profile that distinguishes between violent content and sexual content will only work if the community-based content rating system distinguishes between violent content and sexual content.

3. Web Filtering Profile Setup

In accordance with an embodiment of the present invention, a primary user of the Web filtering service configures the service by setting up one or more Web filtering profiles for other users of a client machine. The primary user may be, for example, a parent in a household and the other users may be children in the household. As another example, the primary user may be a school administrator and the other users may be students. As still another example, the primary user may be an employer and the other users may be employees.

The configuration is carried out through a configuration process which may comprise an online process managed by a remote server or an offline process executing on the client machine, depending upon the implementation. In accordance with one embodiment of the present invention, the primary user must provide a unique user ID and a password in order to be recognized by the system as the primary user and to be granted access to the configuration process.

The configuration process allows the primary user to set up Web filtering policies for other users of the client machine. For example, where the primary user is a parent, the parent can use the configuration process to set up a first policy for a first child who may be using the client machine and a second policy for a second child who may be using the client machine. These policies are then converted into Web filtering profiles for each child.

The manner in which information is solicited from the primary user to set up a policy for another user may vary widely depending upon the implementation. For example, the primary user may be required to provide the age of the other user, to indicate types of content that are appropriate/inappropriate for the other user, to indicate a degree of certain types of content that are appropriate/inappropriate for the other user, or the like.

In another embodiment of the present invention, the primary user is asked to provide a list of Web sites that the primary user is familiar with or visits regularly but that the primary user wishes to be blocked with respect to another user.

In still another embodiment, the primary user is asked a series of predefined questions to determine which type of content should be passed or which type of content should be filtered. In a still further embodiment, the primary user is shown one or more example Web sites, Web pages or other types of content to determine whether or not the primary user considers the content appropriate or inappropriate for the purposes of Web filtering. The example content shown to the user may be actual content available on the Web or content designed or edited solely for the purpose of performing the configuration process.

To avoid shocking or offending the primary user, such example content may be edited to wholly or partially obscure potentially-offensive material. For example, images contained in the example content may be blocked or partially obscured. Likewise, to avoid shocking or offending the primary user, a series of examples may be displayed to the primary user, wherein the examples become increasingly more likely to offend (e.g., the content becomes increasingly more violent or increasingly more sexual). The examples are displayed consecutively until the primary user designates one of the examples as offensive or inappropriate. In one embodiment, example content is shown to the primary user only to help define "borderline" cases.

Where the example content is actual content available on the Web, the information about the exemplary content provided during configuration may advantageously be used to generate community-based rating information for the content. Furthermore, information provided by the primary user during the configuration process may be used to place the user in a group of users having similar sensibilities, as described above in Section B.4.

C. User-Specific Web Filtering Based on Community-Based Content Ratings

As discussed above, an embodiment of the present invention performs user-specific Web filtering based on community-based content rating information. In accordance with such an embodiment, a user request for content is received. Responsive to receiving the user request, community-based rating information associated with the requested content is retrieved. The community-based rating information is then compared to a user-specific Web filtering profile associated with the user requesting the content. Based on the results of this comparison, the requested content is either delivered to the user or the content request is denied.

One approach to the performance of user-specific Web filtering based on community-based content rating information was described above in reference to FIGS. 5 and 6. However, the system and method described above in reference to FIGS. 5 and 6, respectively, each represent only a single exemplary embodiment of the present invention. Other implementations that differ significantly in terms of structure, function, and operation may be used to practice the present invention.

For example, in an alternate embodiment of the present invention, the functions of retrieving community-based rating information associated with the requested content, comparing the community-based rating information to a user-specific Web filtering profile associated with the user requesting the content, and then either delivering the requested content or denying the content request based on the comparison (attributed to Web server 506 in FIG. 5) are performed by software located on each client machine rather than on a remote server. For example, such software may be downloaded to the client machine upon joining or subscribing to a Web filtering service.

D. Example Computer System Implementation

Each of the client machines and servers shown in FIGS. 1, 3, 5 and 15 as well as each of the methods or steps depicted in FIGS. 2, 4, 6, 13 and 14 may be implemented using any well-known processor-based computer system. An example of such a computer system 1600 is depicted in FIG. 16.

Figure 16:
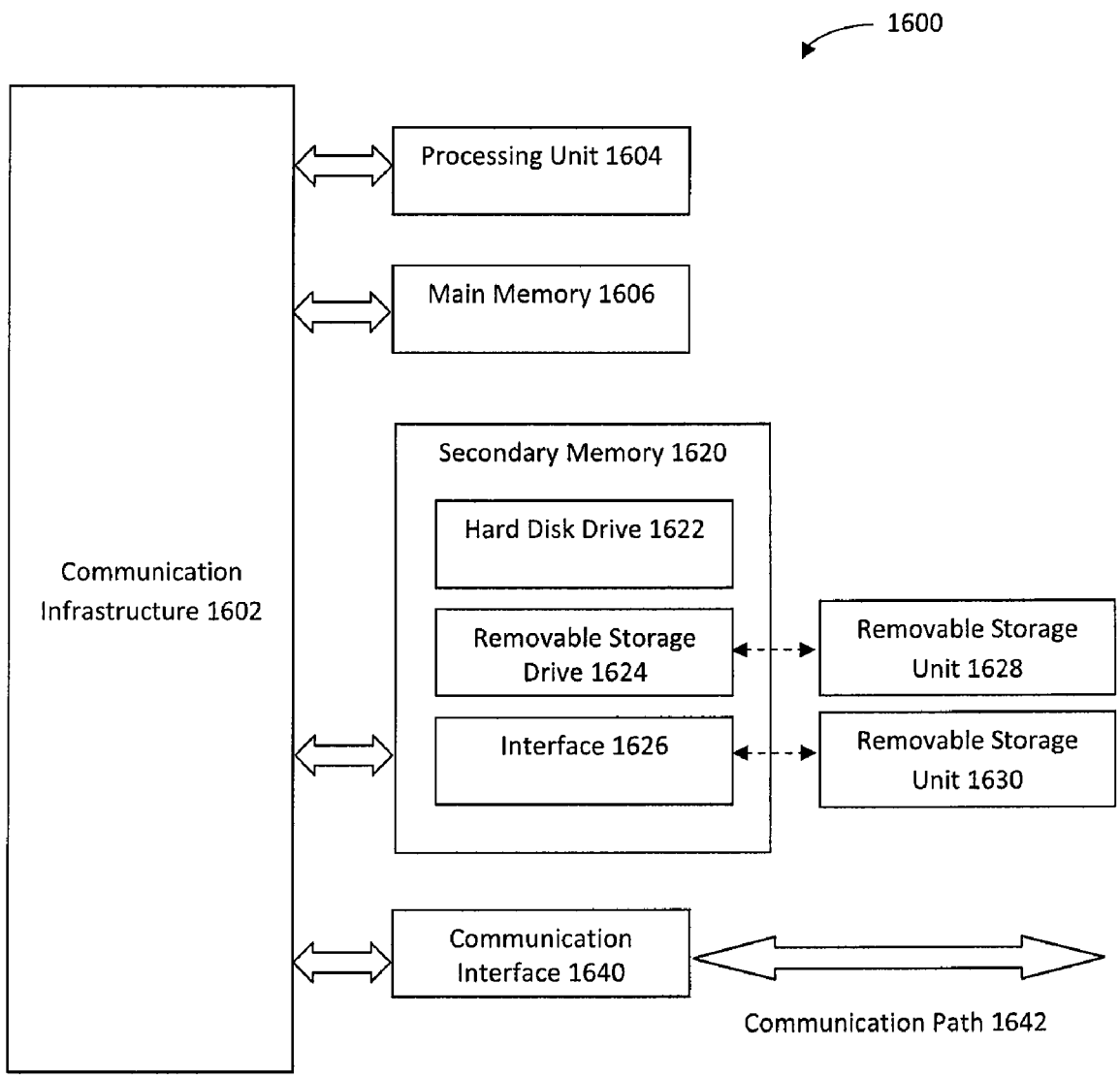
FIG. 16 illustrates an example processor-based computer system that may be used to implement the present invention.

As shown in FIG. 16, computer system 1600 includes a processing unit 1604 that includes one or more processors. Processor unit 1604 is connected to a communication infrastructure 1602, which may comprise, for example, a bus or a network.

Computer system 1600 also includes a main memory 1606, preferably random access memory (RAM), and may also include a secondary memory 1620. Secondary memory 1620 may include, for example, a hard disk drive 1622, a removable storage drive 1624, and/or a memory stick. Removable storage drive 1624 may comprise a floppy disk drive, a magnetic tape drive, an optical disk drive, a flash memory, or the like. Removable storage drive 1624 reads from and/or writes to a removable storage unit 1628 in a well-known manner. Removable storage unit 1628 may comprise a floppy disk, magnetic tape, optical disk, or the like, which is read by and written to by removable storage drive 1624. As will be appreciated by persons skilled in the relevant art(s), removable storage unit 1628 includes a computer usable storage medium having stored therein computer software and/or data.

In alternative implementations, secondary memory 1620 may include other similar means for allowing computer programs or other instructions to be loaded into computer system 1600. Such means may include, for example, a removable storage unit 1630 and an interface 1626. Examples of such means may include a program cartridge and cartridge interface (such as that found in video game devices), a removable memory chip (such as an EPROM, or PROM) and associated socket, and other removable storage units 1630 and interfaces 1626 which allow software and data to be transferred from the removable storage unit 1630 to computer system 1600.

Computer system 1600 may also include a communications interface 1640. Communications interface 1640 allows software and data to be transferred between computer system 1600 and external devices. Examples of communications interface 1640 may include a modem, a network interface (such as an Ethernet card), a communications port, a PCM-CIA slot and card, or the like. Software and data transferred via communications interface 1640 are in the form of signals which may be electronic, electromagnetic, optical, or other signals capable of being received by communications interface 1640. These signals are provided to communications interface 1640 via a communications path 1642. Communications path 1642 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 1628, removable storage unit 1630, a hard disk installed in hard disk drive 1622, and signals received by communications interface 1640. Computer program medium and computer useable medium can also refer to memories, such as main memory 1606 and secondary memory 1620, which can be semiconductor devices (e.g., DRAMs, etc.). These computer program products are means for providing software to computer system 1600.

Computer programs (also called computer control logic, programming logic, or logic) are stored in main memory 1606 and/or secondary memory 1620. Computer programs may also be received via communications interface 1640. Such computer programs, when executed, enable the computer system 1600 to implement features of the present invention as discussed herein. Accordingly, such computer programs represent controllers of the computer system 1600. Where the invention is implemented using software, the software may be stored in a computer program product and loaded into computer system 1600 using removable storage drive 1624, interface 1626, or communications interface 1640.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for generating community-based rating information concerning network-accessible content, comprising:
   a Web server comprising at least one hardware processing unit and a memory, the Web server configured to display to a first user a community-based rating of at least one of a Web site or a Web page accessed by the first user over the network and to receive user feedback from the first user regarding the at least one of the Web site or the Web page;
   a rating server coupled to the Web server, the rating server configured to automatically generate an initial community-based rating concerning the at least one of the Web site or the Web page, to analyze the user feedback from the first user in conjunction with user feedback provided by other users concerning the at least one of the Web site or the Web page, wherein performing the analysis includes weighing user feedback provided by a user belonging to the same group as the first user heavier than user feedback provided by a user not belonging to the same group as the first user, and to automatically generate updated community-based rating information concerning the at least one of the Web site or the Web page based on the analysis; and
   a rating database coupled to the rating server, the rating database configured to store the updated community-based rating information for use in the performance of a Web filtering operation that includes either satisfying or denying subsequent user requests for the at least one of the Web site or the Web page.

2. The system of claim 1, wherein the user feedback relates to the appropriateness of the at least one of the Web site or the Web page for children.

3. The system of claim 1, wherein the Web server is further configured to provide the first user with an interface by which to provide the user feedback.

4. The system of claim 3, wherein the interface is configured to display a current community-based rating associated with the at least one of the Web site or the Web page.

5. The system of claim 1, wherein the rating server is further configured to validate the user feedback provided by the first user.

6. The system of claim 1, wherein the rating server is further configured to automatically generate the initial community-based rating concerning the at least one of the Web site or the Web page using an automated software tool.

7. A method for performing Web filtering based on community-based content rating information, comprising:
   automatically generating an initial community-based rating concerning at least one of a Web site or a Web page;
   receiving, by a Web server, user feedback from a first user regarding the at least one of the Web site or the Web page;
   analyzing, by a rating server, the user feedback from the first user in conjunction with user feedback provided by other users concerning the at least one of the Web site or the Web page to generate community-based rating information, the analyzing including weighting user feedback provided by a user belonging to a same group as the first user heavier than user feedback provided by a user not belonging to the same group as the first user;

automatically generating an updated community-based rating concerning the at least one of the Web site or the Web page based on the analysis; receiving, by a hardware processing unit of the Web server, a request for at least one of the Web site or the Web page from a second user;

obtaining the updated community-based rating information associated with the at least one of the Web site or Web page;

obtaining a user-specific Web filtering profile associated with the second user requesting the at least one of the Web site or the Web page;

comparing the updated community-based rating information to the user-specific Web filtering profile; and either delivering the at least one of the Web site or the Web page to the second user or denying the request based on results of the comparison.

8. The method of claim 7, wherein the community-based rating information relates to the appropriateness of the at least one of the Web site or the Web page for children.

9. A method for generating community-based rating information concerning network-accessible content, comprising:

automatically generating an initial community-based rating concerning at least one of a Web site or a Web page;

receiving, by a hardware processing unit of a Web server, user feedback from a first user regarding the at least one of the Web site or the Web page;

analyzing, by a rating server, the user feedback from the first user in conjunction with user feedback provided by other users concerning the at least one of the Web site or the Web page, the analyzing including weighting user feedback provided by a user belonging to a same group as the first user heavier than user feedback provided by a user not belonging to the same group as the first user;

automatically generating updated community-based rating information concerning the at least one of the Web site or the Web page based on the analysis; and storing, by a rating database, the updated community-based rating information for use in the performance of a Web filtering operation that includes either satisfying or denying subsequent user requests for the at least one of the Web site or the Web page.

10. The method of claim 9, wherein the user feedback relates to the appropriateness of the at least one of the Web site or the Web page for children.

11. The method of claim 9, further comprising:
providing the first user with an interface by which to provide the user feedback.

12. The method of claim 11, further comprising:
displaying a current community-based rating associated with the at least one of the Web site or the Web page via the interface.

13. The method of claim 9, further comprising:
validating the user feedback provided by the first user.

14. The method of claim 9,
wherein automatically generating the initial community-based rating concerning the at least one of the Web site or the Web page comprises using an automated software tool.

* * * * *